Figure 1:
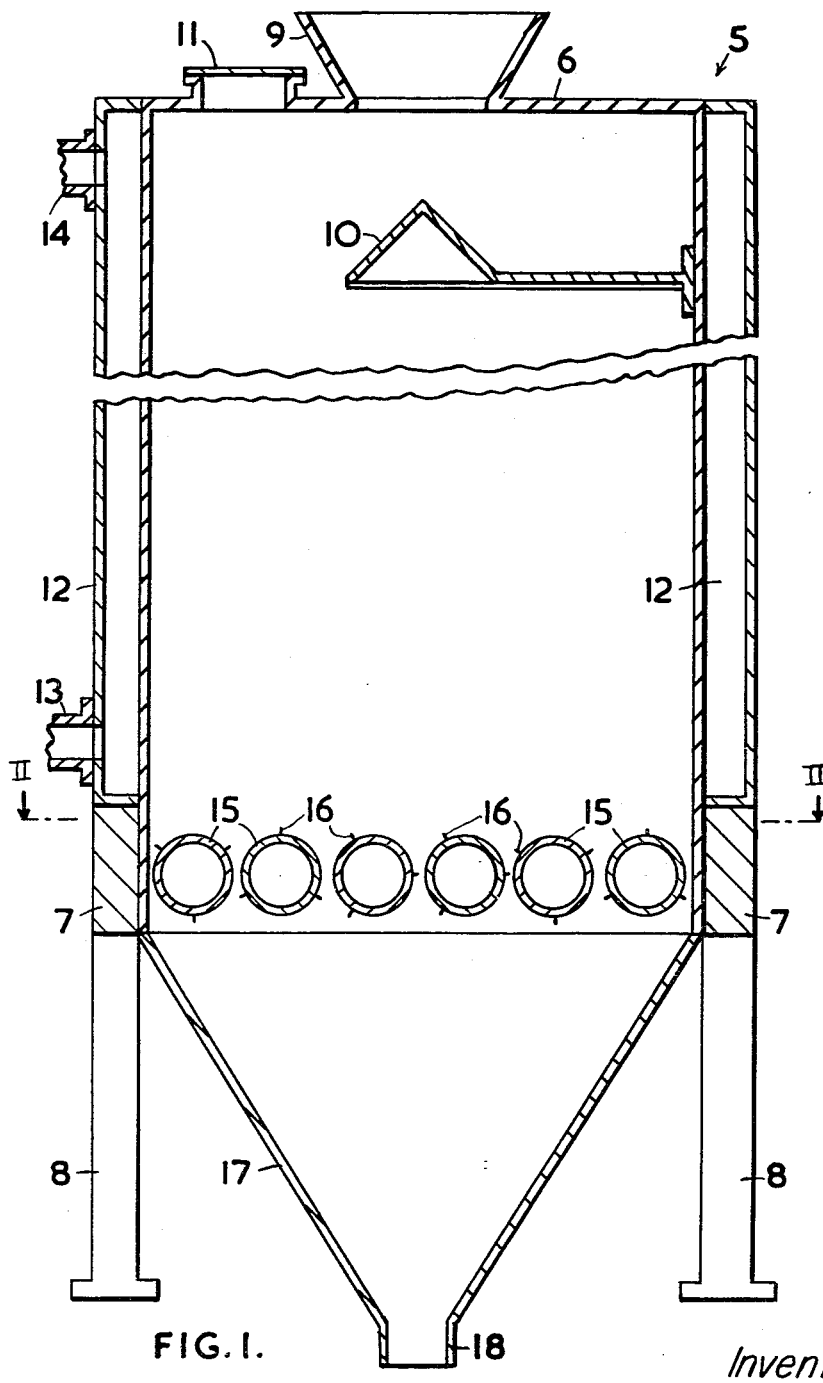

July 10, 1956     J. O. SMITH ET AL     2,754,181

APPARATUS FOR USE IN THE PRODUCTION OF VISCOSE

Filed June 4, 1952     3 Sheets-Sheet 1

FIG. I.

Inventors
John Oliver Smith
William Reginald Weigham
By their attorneys

Howson and Howson

July 10, 1956     J. O. SMITH ET AL     2,754,181
APPARATUS FOR USE IN THE PRODUCTION OF VISCOSE
Filed June 4, 1952     3 Sheets-Sheet 2

Inventors
John Oliver Smith
William Reginald Weigham
By their attorneys
Howson and Howson United States Patent Office 2,754,181
Patented July 10, 1956

2,754,181
APPARATUS FOR USE IN THE PRODUCTION OF VISCOSE

John O. Smith, Coventry, Warwickshire, England, and William R. Weigham, Holywell, Flintshire, Wales, assignors to Courtaulds Limited, London, England, a British company Application June 4, 1952, Serial No. 291,668

Claims priority, application Great Britain July 5, 1951

1 Claim. (Cl. 23—283)

This invention relates to apparatus for use in the production of viscose and more particularly to apparatus for ageing alkali cellulose.

In the normal viscose process, cellulose in the form of sheets or slurry is steeped in caustic soda solution, excess caustic soda is removed and the alkali cellulose obtained is reduced to so-called "crumbs" form. The alkali cellulose crumbs are usually aged and are then treated with carbon disulphide to form cellulose xanthate which is dissolved in dilute caustic soda to form viscose. In order to obtain a uniform product it is desirable to maintain substantially uniform conditions for each crumb; in addition the control of temperature at each stage is important. In general the period necessary for ageing decreases with an increase in temperature and in practice elevated temperatures are being used. Temperatures of 40° to 45° centigrade or higher are employed particularly in slurry steeping processes. On the other hand, for xanthation the proportion of undesirable by-products increases with increasing temperature, and in practice xanthation temperatures between 20° and 30° centigrade are desirable but not essential. As alkali cellulose crumbs have a low heat conductivity, difficulty is met in maintaining uniformly the required temperatures at the various stages throughout the material undergoing treatment.

A batch process has generally been used for the production of viscose although proposals have been made to enable a continuous process to be used. A process for the continuous ageing of alkali cellulose is proposed in British patent specification No. 488,793 in which shredded alkali cellulose is subjected to ripening in a slightly inclined rotary tube which is less than half full of the alkali cellulose. A method of ageing cellulose is described in United States patent specification No. 2,490,097 in which the alkali cellulose in crumb form is continuously spread uniformly across the top of a vertical ageing zone of uniform cross sectional area throughout its height and is allowed to settle by gravity and is continuously removed uniformly from the bottom by picking.

The object of the present invention is to facilitate a change of temperature between the ageing and xanthation stages.

According to the present invention an apparatus for ageing alkali cellulose comprises a silo merceriser having a stationary ageing compartment through which the alkali cellulose crumbs pass vertically downwards, mechanical pickers to remove crumbs continuously or intermittently from the bottom of the compartment and means for cooling the alkali cellulose during, after, or both during and after its removal by the pickers.

In a preferred embodiment of the present invention apparatus for ageing alkali cellulose comprises a silo merceriser having a stationary ageing compartment through which the alkali cellulose passes vertically downwards and mechanical pickers to remove crumbs continuously or intermittently from the compartment wherein the mechanical pickers have cooling surfaces with which alkali cellulose will come in contact during its removal.

Alternatively, or in addition to the cooling surfaces of the mechanical pickers, cooling means, for example a cooling drum may be provided to receive the crumbs of alkali cellulose discharged from the bottom of the ageing compartment, or the space beneath the pickers may be enclosed to form a discharge hopper and the air temperature and humidity controlled to produce cooling of alkali cellulose falling through it.

The silo merceriser may take the form of a vertical tower of uniform cross section forming an ageing compartment to which the alkali cellulose crumbs may be fed to the top and removed from the bottom after taking a predetermined and uniform time to pass down the compartment. The tower may be of circular, square, rectangular or other cross section. If desired the tower may increase slightly in cross section, from the top to the bottom or the cross section may change for example from a circular to a square cross section.

The ageing compartment is preferably lagged with heat insulating material or may have a jacket through which liquid at a controlled temperature may circulate thereby controlling the temperature to a desired degree.

The mechanism for removing the crumbs may comprise, across the bottom of the compartment, a number of rotatable shafts or rollers each provided with suitable picker fingers or cutting blades. The shafts or rollers may be hollow to permit the passage of a cooling liquid so that the shafts or rollers will have cooling surfaces with which the crumbs will make contact.

The rotating shafts or rollers with picker fingers may be replaced by any other mechanical device which will allow a substantially uniform removal of the alkali cellulose crumbs accompanied by contact with a cooling surface.

The cooling means to receive the crumbs of alkali cellulose discharged from the bottom of the ageing compartment preferably takes the form of a cylindrical rotatable drum arranged with its axis at a slight angle to the horizontal and having a jacket which can be supplied with a cooling medium, preferably water. The drum is rotated by external gearing.

In a specific example, alkali cellulose can be fed continuously to a silo merceriser having an ageing compartment which is 20 feet high, with a rectangular cross section of internal dimensions 15 feet by 9 feet. The alkali cellulose can be maintained at a temperature of 40° centigrade during its passage through the compartment. The mechanical pickers in the bottom of the compartment are mounted on shafts which rotate, i. e. revolve continuously or intermittently, and pick the alkali cellulose from the compartment. The alkali cellulose is discharged into a cooling drum comprising a rotating cylinder 15 feet long having an inside diameter of 7 feet and arranged with its axis at an angle of 1° to the horizontal. Water can be circulated through the jacket of the cooling drum to reduce the temperature of the alkali cellulose leaving the drum to 20° centigrade.

After leaving the ageing apparatus the crumbs may be subjected to a light opening before passing to the xanthation stage. The opening and the time interval between ageing and xanthation allows the crumbs to assume a substantially uniform temperature.

The apparatus according to the invention allows ageing of the alkali cellulose at a temperature of for example 40° centigrade and the delivery of the alkali cellulose to the xanthation stage at a temperature of for example 20° centigrade.

The apparatus according to the invention is particularly useful in the production of viscose by a continuous process.

Figure 2:
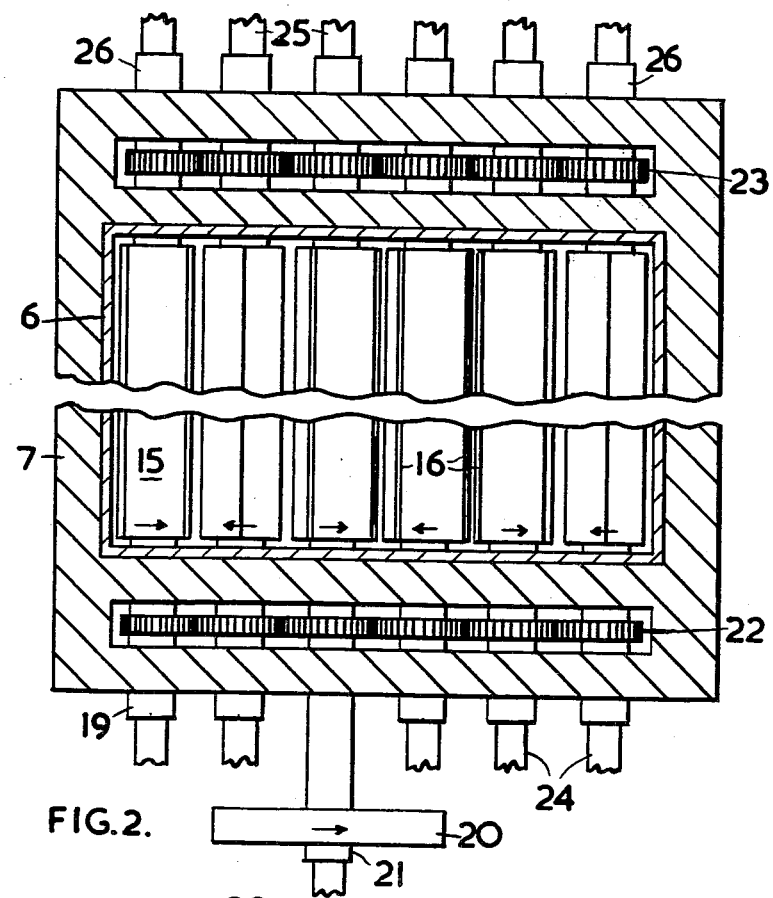
Figure 3:
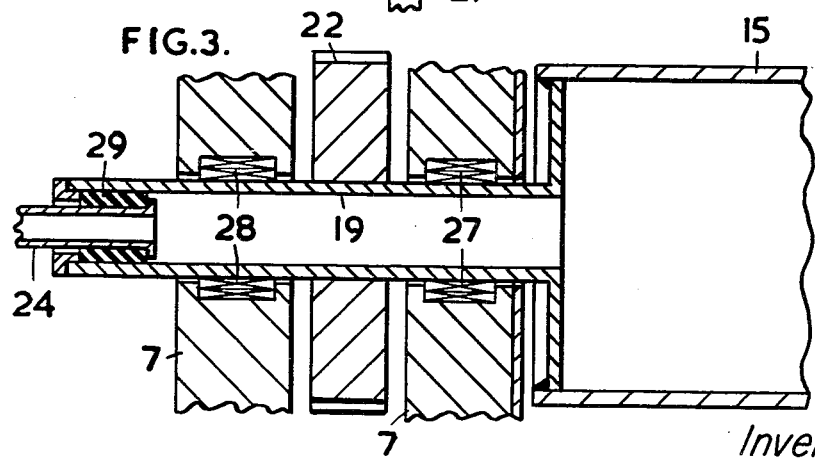
Figure 4:
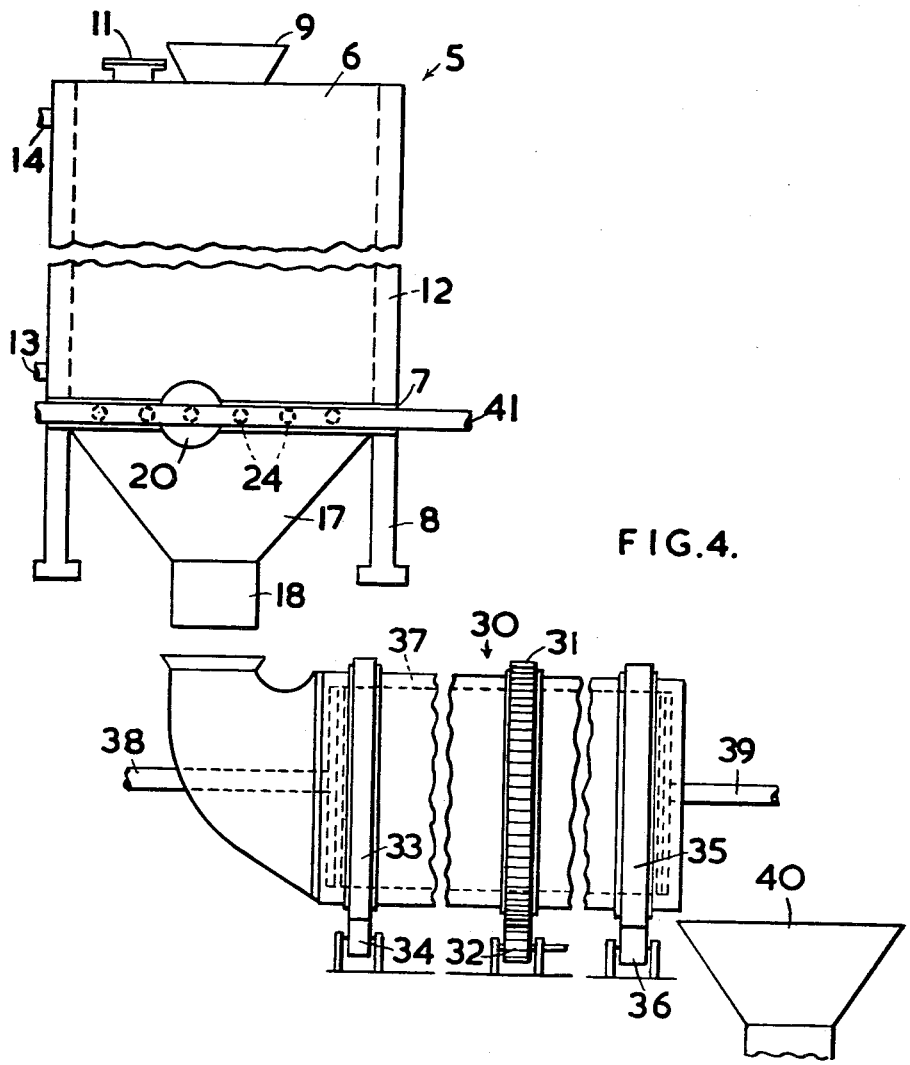

Examples of the apparatus according to the invention are illustrated in the accompanying drawings in which:

Figure 1 is a vertical section through a silo merceriser constructed according to one embodiment of the invention, Figure 2 is a horizontal section along the line II—II of Figure 1, showing the arrangement of the mechanical pickers in the silo merceriser, Figure 3 is an enlarged view in section of a mechanical picker and its mounting, and Figure 4 shows another embodiment of the invention utilising a cooling drum.

In Figure 1 a silo merceriser 5 has an ageing compartment 6 supported in a main frame 7 mounted on supports 8. The compartment 6 has a supply hopper 9 for feeding in alkali cellulose, a cone distributer 10, an inspection cover 11 and a heat insulating jacket 12 through which a heating or cooling fluid may be passed as required by means of an inlet pipe 13 and an outlet pipe 14, to control the temperature. At the bottom of the compartment 6 is a number of mechanical pickers, each picker comprises a rotatable roller 15 which is hollow and which has cutting blades 16 protruding from the surface of the roller. There is a small clearance between adjacent rollers and the cutting blades do not intermesh. Below the rollers 15 is a discharge hopper 17 having an outlet 18.

Referring to Figures 2 and 3 the main frame 7 supports shafts 19 and 26 of the rollers 15 in bearings, two of which, 27 and 28 are shown in Figure 3. A wheel 20 is fixed to an extension 21 of one of the shafts 19 and is driven by any convenient means (not shown). Wheel 20 drives the shaft 19 on to which it is fixed and by means of a series of gear wheels 22 and 23 the remaining shafts and rollers are also rotated, i. e. revolved in the directions shown by the arrows in Figure 2. A series of non-rotating pipes 24 supply cooling fluid to the hollow shafts 19 and rollers 15 and a corresponding series of non-rotating pipes 25 fitted into shafts 26 provide a fluid outlet. A seal 29 prevents leakage of the fluid.

In operation alkali cellulose is supplied continuously to the compartment 6 through the supply hopper 9 and is distributed uniformly over the compartment by the cone distributer 10. The alkali cellulose passes slowly down the compartment 6 and is maintained at a constant temperature, preferably 40° to 45° centigrade by the fluid in jacket 12. The alkali cellulose ages during its passage through the chamber and is discharged from the compartment 6 by the rotating picker rollers 15. The cooling fluid circulating through the rollers 15 is at a lower temperature than the chamber 6, preferably 20° to 30° centigrade, and the alkali cellulose is cooled as it comes into contact with the rollers 15 and cutting blades 16. The cooled alkali cellulose crumbs picked from the alkali cellulose in the compartment 6 pass into the discharge hopper 17 and through the outlet 18 to a xanthating churn (not shown). If desired the crumbs may be subjected to a light opening between the ageing and the xanthation stage.

In Figure 4 alkali cellulose is fed continuously through the silo merceriser 5 and is aged at a temperature of 40° to 45° centigrade and is discharged into a cooling drum 30 which is rotated externally by means of gearing 31 and 32. Additional guiding rollers 33 and 34, 35 and 36 may also be provided. The drum is inclined at a slight angle to the horizontal, preferably 1°, and has a jacket 37 through which a cooling fluid may be circulated by means of pipes 38 and 39. The cooling fluid is preferably at 20° to 30° centigrade and the alkali cellulose is cooled as it passes slowly through the drum. On leaving the drum the cooled alkali cellulose falls into a chute 40 leading to a xanthating churn (not shown). In the drawing the silo merceriser 5 is shown having a pipe 41 supplying cooling fluid through pipes 24 to the hollow picker rollers (not shown) but this cooling step may be omitted if desired.

The silo merceriser and the cooling drum may be of any suitable dimensions; for example the mercerizer may be 20 feet high with a rectangular cross section of internal dimensions 12 feet by 6 feet. The cooling drum may comprise a rotating cylinder 15 feet long and having an inside diameter of 7 feet and arranged with its axis at an angle of 1° to the horizontal.

What we claim is:

In a silo mercerizer having a vertical stationary compartment for ageing alkali cellulose crumbs, an inlet at the top for alkali cellulose, an outlet at the bottom through which aged cellulose crumbs are discharged to a xanthating compartment, means for sustaining the temperature of the material in the compartment, and means for moving crumbs uniformly downward to said outlet while simultaneously cooling only that portion of the aged cellulose which is being separated from the main body of the material and moved to discharge, comprising a series of hollow pipes across the outlet with a small clearance between the pipes for said crumbs, means to revolve said pipes, cutting blades protruding outwardly from the surface of said pipes for moving crumbs uniformly downward between the pipes and spaced so as not to intermesh when the pipes revolve, a series of inlet pipes connected to one end and a series of outlet pipes connected to the other end of said rotating pipes for circulating cooling fluid through said pipes, said rotating pipes and connections for cooling fluid providing a cooling plane through which said crumbs pass and are cooled below the temperature of the main body simultaneously with the separation thereof from the main body of material.

References Cited in the file of this patent
UNITED STATES PATENTS

| | | |
|---|---|---|
| 890,552 | Bibb | June 9, 1908 |
| 1,585,449 | Welsh | May 18, 1926 |
| 1,977,098 | Thal | Oct. 16, 1934 |
| 2,490,097 | Seaman et al. | Dec. 6, 1949 |
| 2,530,403 | Seaman | Nov. 21, 1950 |